INVENTORS.
John Paul Kemmer
Robert E. Scott

By Alan C. Rose
Attorney

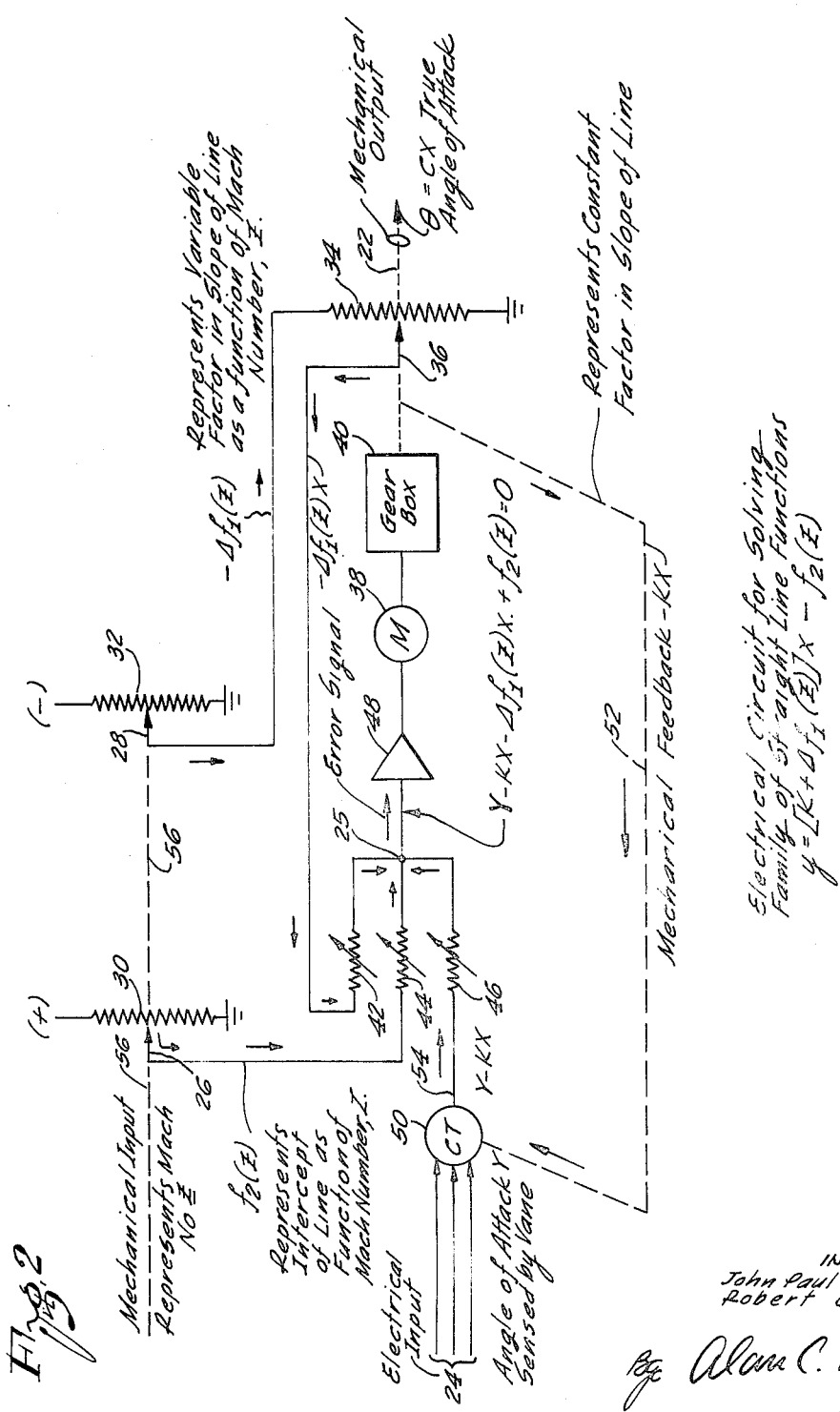

United States Patent Office 3,251,982
Patented May 17, 1966

3,251,982
SERVO COMPUTER CIRCUIT PARTICULARLY ADAPTED TO COMPUTE ANGLE OF ATTACK
John Paul Kemmer, Woodland Hills, and Robert E. Scott, Los Angeles, Calif., assignors to Litton Systems, Inc., Beverly Hills, Calif.
Filed Apr. 17, 1961, Ser. No. 103,617
14 Claims. (Cl. 235—150.2)

This invention relates to servo systems, and more particularly to servo systems for determining the solution of a family of related functions. In a specific aspect, the invention involves the determination of the true "angle of attack" of aircraft or the like from data indicating the sensed angle of attack and the Mach number of the aircraft.

With regard to the definition of terms, the angle of attack is the angle between the longitudinal axis of an aircraft and the direction of relative wind of the medium through which the aircraft is passing. Thus, for example, the angle of attack of a plane during its initial climb after take-off is relatively high, and the angle of attack during level flight is normally relatively small. The term "Mach number" relates to the speed of the aircraft with respect to the speed of sound at the temperature, atmosphere, density and other conditions to which the aircraft is subjected. Thus, the term "Mach 2" refers to a speed which is twice the velocity of sound.

In the determination of angle of attack, a small sensing vane is pivotally mounted on the outer surface of the aircraft. This vane performs a function which is similar to that of a weather vane. As the angle of attack changes, the vane shifts in angular position with respect to the airplane on which it is mounted. The shaft on the vane is mounted is coupled to a synchro transmitter to produce electrical signals representing the sensed angle of attack. The Mach number is computed from the pressures which may be determined on the surface of the airplane, and from other known factors. The equations relating Mach number with these factors are discussed in a text entitled "The Dynamics and Thermodynamics of Compressible Fluid Flow" by A. H. Shapiro, Ronald Press Co., New York, 1953, 2 vols.

For various reasons the true angle of attack differs significantly from the angle of attack as sensed by the vane. Furthermore, it is important for proper operation of the aircraft to have the true angle of attack available. In this regard it might be noted that the aerodynamic properties of aircraft are critically dependent upon the true angle of attack. It has been determined that the true angle of attack is principally dependent upon the sensed angle of attack and the Mach number. In systems which have been proposed up to the present time for determining the true angle of attack from the sensed angle of attack and the Mach number, the apparatus has involved complex three-dimensional cams and other expensive and non-standard mechanical and electrical arrangements.

Accordingly, a principal object of the present invention is to simplify and reduce the cost of apparatus for determining the true angle of attack of aircraft from the sensed angle of attack and the Mach number. A collateral object of the present invention is to determine the solution of a family of related functions.

In accordance with the present invention, it has been determined that for any given Mach number, the true and the sensed angles of attack are related to each other by a straight line. However, the intercept and the slope of the straight line both change with Mach number. It has also been determined that the slope of the straight lines may be separated into two components, one of which is a constant, and the other varies with Mach number.

Through analysis of the equations and the family of straight lines, it has been determined that a special servo system in which both mechanical and electrical feedback is employed provides a simple and convenient solution to the problem which is presented. The output shaft position of a servo motor represents the true angle of attack of the aircraft. The slope of the straight line relating the sensed angle of attack with the true angle of attack is determined by the two feedback paths. As they represent the slope coefficient, they necessarily depend on the true angle of attack, as represented by the servo motor position. More particularly, the electrical feedback loop through a feedback potentiometer, coupled to the servo motor output shaft provides a slope coefficient which may be varied with Mach number through changes in the voltage applied across the potentiometer.

The mechanical feedback loop, however, provides a slope coefficient which is essentially constant with changes in Mach number. The mechanical feedback is coupled directly to the rotor of a synchro control transformer. The input signals to this control transformer represent the sensed angle of attack. Normally, a synchro control transformer is rotated until a null output signal is produced at the input to a servo amplifier included in the servo loop. In the present case, however, the synchro control transformer is normally operated slightly away from its null point, in view of the displacement caused by the mechanical feedback, and other arrangements, as noted below. Under these conditions, the resultant output signal from the transformer is a linear function related to the mechanical feedback. The output from the transformer therefore represents the algebraic sum of the sensed angle of attack, and the product of a constant representing the fixed portion of the slope coefficient multiplied by the true angle of attack.

The servo motor is controlled by a servo amplifier which is energized by a summing circuit. Connected as inputs to the summing circuit are the electrical feedback path mentioned above and the output from the synchro control transformer. A third input to the summing circuit is a signal representing the intercept of the straight line function under consideration. This signal varies with Mach number, and may be derived from a potentiometer driven by a shaft having a position which represents Mach number.

Going back to fundamentals, the classic equation for a straight line is:

$$y = ax + b \tag{1}$$

Where the variables are $x$ and $y$, the constant $a$ determines the slope of the line and $b$ determines its intercept. In the present case, the slope factor is made up of two components, one of which is fixed and the other depends on a third variable, $z$. This may be represented as follows:

$$a = k + f(z) \tag{2}$$

Now, substituting in Equation 1:

$$y = [k + f(z)]x + b \tag{3}$$

Continuing with the analysis, when Equation 3 is expanded and the terms are transposed, the following equation is produced:

$$y - kx - f(z)x - b = 0 \tag{4}$$

The servo system of the present invention solves Equation 4 as set forth above at the summing point at the input to the servo amplifier. By way of elaboration, the correspondence between the terms in Equation 4 and the various points in the circuit arrangement described above, will now be explained.

The term $y$ in Equation 4 represents the sensed angle of attack which is the input to the synchro control transformer. The term $x$ in Equation 4 represents the true computed angle of attack which is proportional to the servo shaft position. The term $-k$ is the slope factor which is independent of the additional variable $z$. As discussed above, this term is implemented by the mechanical feedback to the synchro transformer and the two terms $y-kx$ form one of the three inputs to the summing circuit.

The electrical feedback circuit discussed above corresponds to the term $f(z)x$ in Equation 4. As noted above, the feedback potentiometer has voltage applied to it corresponding to $f(z)$, the desired function of the Mach number, and the sliding contact on this feedback potentiometer is moved in accordance with the output of the servo motor, which is proportional to the variable $x$. The second input to the summing network thus corresponds to $f(z)x$. The third input to the summing network is the term $b$ which fixes the intercept of the straight line. The term $b$ is also a function of $z$, although this is not explicitly indicated in Equation 4.

Advantages of the system include the elimination of complicated cams having complex three-dimensional surfaces. A particularly useful feature of the present invention is the use of mechanical feedback to the synchro control transformer to which the signals representing the sensed angle of attack are applied, thereby producing two terms of the equation which must be solved.

In accordance with a feature of the invention, a servo system may include a synchro control transformer, circuitry for applying variable electrical signals to said transformer, a servo amplifier, a servo motor coupled to the servo amplifier, a mechanical linkage intercoupling the servo motor and the synchro control transformer, a summing circuit connected to the input of the servo amplifier, a feedback potentiometer having a sliding contact mechanically coupled to the servo motor and electrically coupled to the summing network, a circuit connecting the output from the control transformer to the summing network and additional circuitry for providing another input to the summing network. In accordance with another feature of the invention, the third input to the summing network and the voltage applied to the feedback potentiometer may be selectively varied.

The novel features which are believed to be characteristic of the invention, both as to its organization and method of construction and operation, together with further objects and advantages thereof, will be better understood from the following description when taken in conjunction with the accompanying drawing in which an illustrative embodiment of the invention is disclosed. It is to be expressly understood, however, that the drawing is for the purpose of illustration and description only and does not define limitations of the invention.

In the drawing:

FIG. 2 is a schematic electro-mechanical circuit diagram indicating the operation of a servo system illustrating the present invention.

Figure 1:
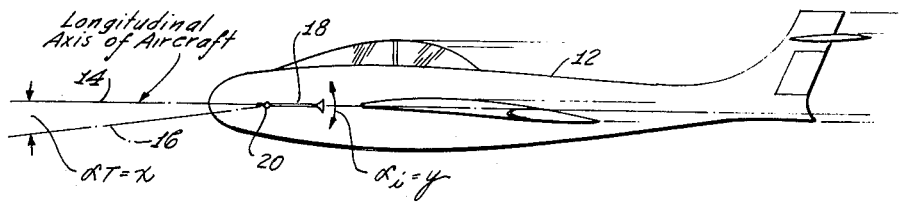
FIG. 1 is a schematic drawing of an airplane indicating the angle of attack.

With reference to the drawings, FIG. 1 shows an aircraft 12 having a longitudinal axis 14. The direction of relative wind is indicated by the dashed line 16. A vane 18 which is pivoted at point 20 is mounted on the outer surface of the aircraft 12. A shaft extends through the skin of the aircraft at the pivot point 20 of the vane 18. A synchro transmitter of the usual type is coupled to the pivot shaft of the vane 18 and produces servo signals indicating the position of the vane 18 with respect to the aircraft. This sensed signal is the sensed angle of attack in the following description. The signals produced by the servo transmitter are of the usual 400-cycle, 3-wire type which are used in aircraft servo systems.

FIG. 2 is a simplified diagram of the circuit which is employed to determine the true angle of attack from the sensed angle of attack. The true angle of attack appears at the right-hand side of the drawing of FIG. 2 as a mechanical output, in which the shaft orientation is indicated by the dashed arrow 22 adjacent the legend:

$$\theta = kx \quad (5)$$

The electrical input on the three leads 24 represents the sensed angle of attack $y$. The summing point 25 in FIG. 2 is the point where the following equation is solved:

$$y - kx - \Delta f_1(z)x + f_2(z) = 0 \quad (6)$$

As compared with Equation 4, it may be noted that the term $-b$ has been replaced by the term $f_2(z)$. This merely indicates that the intercept of the straight line is a function of the mach number $z$. Thus, for a given Mach number, the intercept will have a constant value; however, when the Mach number is changed, the sliding contacts 26 and 28 on potentiometers 30 and 32, respectively, are shifted and the voltage $f_2(z)$, representing the intercept of the straight line, is changed. Similarly, the portion of the feedback which varies with Mach number is also changed. In FIG. 2 this quantity is represented by the designation $-\Delta f_1(z)$ and is applied across potentiometer 34. The symbol $\Delta$ indicates that this is a relatively small quantity. The sliding contact 36 on the potentiometer 34 is positioned in accordance with the shaft of motor 38 after coupling through the gear box linkage 40.

The three input resistors 42, 44 and 46 to the summing point 24 at the input to the servo amplifier 48, are shown as variable resistors. However, they are normally adjusted to provide the proper weight for the various input signals, and subsequently are not changed.

The position of the rotor of the synchro control transformer 50 is controlled by the mechanical feedback linkage represented by the dashed line 52. As noted above, a synchro control transformer such as that designated 50, is a well-known component in servo systems and is discussed, for example, at page 82 of a book entitled "Theory of Servo Mechanisms" by H. M. James, N. B. Nichols and R. S. Phillips, Massachusetts Institute of Technology, Radiation Laboratory Series, vol. 25, McGraw-Hill Book Company, Inc., 1947. A control transformer is normally followed immediately by a servo amplifier and by a servo motor. When it is included in a feedback loop of this type, the servo motor operates to rotate the rotor of the control transformer until its output is zero. In this null position, no error signal is transmitted to the servo amplifier and the servo motor no longer operates. In the present case, however, the control transformer 50 is operated not at the null position but in the regions near the null position. The displacement of the rotor from the null position produces a voltage on lead 54 at the output from the control transformer which is a direct linear function of the displacement from the null position. Accordingly, the signal on lead 54 corresponds to the algebraic sum of the input signal $y$ on leads 24 and the mechanical signal $-kx$ applied through the mechanical feedback path 52.

The other two signals applied to summing resistors 42 and 44 include the electrical feedback signal $-\Delta f_1(z)x$, and $f_2(z)$. The first of these terms involves the portion of the slope coefficient which is dependent upon Mach number and the second of these terms, $f_2(z)$, represents the intercept of the straight line for a given Mach number.

In operation, as the vane 18 of FIG. 1 moves to a different sensed angle of attack, the signals $y$ applied to the leads 24 change, and the voltage applied to resistor 46 unbalances the signal at the input to servo amplifier 48. This operates motor 38 to change the mechanical and electrical feedback, at linkage 52 and at slider 36 on potentiometer 34, respectively. This action continues until the system is rebalanced and full cancellation takes place at the summing point 24.

Now, it will be assumed that the sensed angle of attack $y$ remains constant and that the Mach number $z$ changes. Under these conditions, the mechanical input 56 changes the position of sliding contacts 26 and 28 of potentiometers 30 and 32. This produces a new value of $-\Delta f_1(z)$ as applied to potentiometer 34. It also changes the value of $f_2(z)$, determining a new value for the intercept of the straight line characteristics. Again the balance of the servo system is upset. The servo motor 38 again operates in the proper sense to restore balance and the true angle of attack is once more presented by the output linkage 22 of the system.

Figure 3:
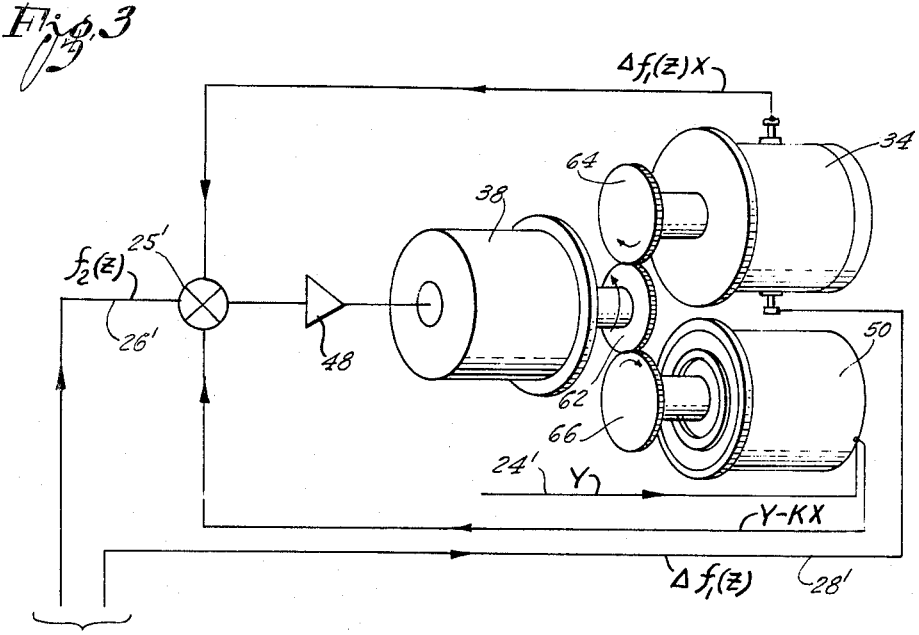
FIG. 3 is another electro-mechanical drawing in accordance with the present invention which indicates the mechanical arrangement of a portion of the circuit of FIG. 2 in greater detail.

The mechanical arrangement of the system of FIG. 2 is shown in greater detail in FIG. 3. In this subsequent figure, the summing point 25 corresponds to the summing point 25 and its associated resistors, in FIG. 2. The amplifier 48 and motor 38 of FIG. 3 bear the same numbers as their counterparts in FIG. 2. The gearing 62, 64 and 66 of FIG. 3 interconnects the output of motor 38 with the potentiometer 34 and the control transformer 50. The input lead 28' to the potentiometer 34 corresponds to the slider 28 of potentiometer 32 in FIG. 2. Similarly, the lead 26' corresponds to slider 26 of FIG. 2. The correspondence of the remaining leads of FIGS. 2 and 3 are evident. An interesting feature to be noted from the examination of FIG. 3 is the close proximity of the control transformer 50 with the motor 38 which is dictated by their mechanical coupling.

It is to be understood that the above-described arrangements are illustrative of the application of the principles of the invention. Numerous other arrangements may be devised by those skilled in the art without departing from the spirit and scope of the invention. Thus, by way of example and not of limitation, the circuit elements shown in FIGS. 2 and 3 may be replaced by components performing comparable functions. Specifically, the control transformers could be replaced by linear transformers, if proper compatible circuitry is employed at the sensing vane; as another variation, a nonlinear feedback potentiometer could be employed to produce families of nonlinear functions, instead of the straight line functions discussed above. Accordingly, from the foregoing remarks, it is understood that the present invention is to be limited only by the appended claims.

What is claimed is:

1. In a servo system for providing an output which is substantially a straight line function of a first variable and having the approximate form:

$$y=ax+b$$

and wherein $a$ and $b$ are functions of another variable $z$; the system comprising a synchro control transformer, means for applying electrical signals to said synchro control transformer which are representative of the variable quantity $y$; a pair of potentiometers, means for mechanically adjusting the sliding contacts on each of said potentiometers in accordance with the function $z$, a feedback potentiometer connected to the sliding contact on one of said pair of potentiometers; a summing network; means for applying the output from said synchro control transformer, the output from the other of said pair of potentiometers and the output from said feedback potentiometer to said summing network; a servo amplifier and a servo motor serially connected to the output from said summing network; said servo motor being mechanically coupled to adjust the sliding contact on said feedback potentiometer; and means for mechanically coupling the output from said servo motor to said synchro control transformer; whereby the shaft position of said servo motor represents the quantity $x$.

2. In combination, a synchro transformer, a summing circuit, a servo amplifier and a servo motor connected to the output of the summing circuit, means for providing electrical signals dependent upon both the position of the servo motor and an independent variable and for coupling these signals to an input of the summing circuit, means for mechanically coupling the servo motor to the synchro transformer, and means for connecting the synchro control transformer output to another input of the summing circuit.

3. A computer for determining the true angle of attack comprising a sensing vane for mounting on the outside of an aircraft, electrical means coupled to the sensing vane for indicating the angle of orientation of the vane with respect to the aircraft, a synchro control transformer connected to receive electrical signals from said means, a serially connected servo amplifier and motor, a summing circuit connected between said transformer and said amplifier, means for mechanically coupling said servo motor to the rotor of said synchro control transformer, and means for providing an electrical signal which is a function of the position of said servo motor and Mach number, and for coupling said last mentioned signal to the summing network.

4. A computer for determining the true angle of attack comprising a sensing vane for mounting on the outside of an aircraft, electrical means coupled to the sensing vane for indicating the angle of orientation of the vane, a synchro control transformer, circuitry for connecting said electrical means to said transformer, a servo amplifier, a servo motor coupled to the output of said servo amplifier, means for mechanically coupling said servo motor to said synchro control transformer, a summing circuit connected to the input of said servo amplifier, a potentiometer mechanically coupled to said servo motor and electrically coupled to said summing network, which is a function of Mach number, means for applying a voltage across said potentiometer, and means for connecting the output from said control transformer to said summing network.

5. In a servo system for providing an output which is a function of a first variable and having the approximate form:

$$y=ax+b$$

and wherein $a$ and $b$ are functions of another variable $z$, the system comprising: a control transformer having a movable rotor; means for applying electrical signals to said transformer which are a measure of the variable quantity $y$; a pair of potentiometers; means for mechanically adjusting the sliding contacts on each of said potentiometers in accordance with the function $z$; a feedback potentiometer connected to the sliding contact on one of said pair of potentiometers; a summing network; means for applying the output signals from said transformer, the output from the other of said pair of potentiometers and the output from said feedback potentiometer to said summing network; a servo amplifier; a servo motor, serially connected to the output from said summing network, said servo motor being mechanically coupled to adjust the sliding contact on said feedback potentiometer, and means for mechanically coupling the output from said servo motor to said transformer, whereby the shaft position of said servo motor is a measure of the desired function $x$.

6. In a computing apparatus, electrical means for indicating an angle, a control transformer having a movable rotor, circuitry for connecting said electrical means to said transformer, a servo amplifier, a servo motor coupled to the output of said servo amplifier, means for mechanically coupling said servo motor to said control transformer rotor, a summing circuit connected to the input of said servo amplifier, a potentiometer mechanically coupled to said servo motor and electrically coupled to said summing network, means for varying the voltage applied to said potentiometer, and means for connecting the output from said transformer to said summing network.

7. A computer comprising: electrical means for indicating an input angle, a control transformer including a movable rotor, circuitry for connecting said electrical means to said transformer, a servo amplifier, a servo motor coupled to the output of said servo amplifier, means for mechanically coupling said servo motor to said transformer rotor, a summing circuit connected to the input of said servo amplifier, a potentiometer mechanically coupled to said servo motor and electrically coupled to said summing network, means for connecting the output from said control transformer to said summing network, and means for providing an additional correction input to said summing network.

8. A simplified angle of attack computer for providing a rotational signal proportional to the true angle of attack in response to one electrical input signal proportional to the sensed angle of attack and two electrical signals which are functions of Mach number comprising:
- a servo circuit including a serially connected input summing device, amplifier, and motor;
- an output shaft connected to said servo circuit for indicating the true angle of attack;
- transducer means for converting the sensed angle of attack to a signal;
- means for connecting said signal to the servo circuit summing device;
- mechanical means, connected to be driven by said motor, and to drive said last named means for connecting said signal to the servo circuit summing device to modify said signal in response to said true angle of attack;
- a feedback loop, including a potentiometer driven by said motor, electrically connected to said summing device;
- means, adapted to be responsive to a Mach number computer, for generating first and second signals, each of which is a function of Mach number;
- means for connecting a first one of said last mentioned signals to said summing device; and
- means for connecting a second one of said last mentioned signals to excite the said potentiometer of said feedback circuit to modify its feedback signal.

9. A servo system for solving an equation for variable X when known values of another variable Y and two functions of a variable Z are fed into the system, wherein each element in the servo system represents a term in the equation to be solved $Y-KX-\Delta f_1(Z)X+f_2(Z)=0$ so that the co-action of the elements gives a solution for term X comprising:
- summing means for combining signals representing each term of the equation $Y-KX-\Delta f_1(Z)X+f_2(Z)=0$;
- an output shaft for providing the mechanical equivalent of the desired unknown quantity X;
- a potentiometer affixed to said shaft for providing the electrical equivalent of the quantity X;
- a synchro transformer for providing the electrial equivalent of the $Y-KX$ term connected to said summing means;
- means for providing the electrical equivalent of the quantity Y connected to the input of said transformer;
- a mechanical feedback arrangement connecting the output shaft to said transformer for providing the mechanical equivalent of $-KX$ quantity;
- means for generating electrical signals equivalent to functions $\Delta f_1(Z)$ and $f_2(Z)$;
- means connecting the $f_2(Z)$ signal to said summing means;
- means connecting the $\Delta f_1(Z)$ signal to said potentiometer providing the X quantity;
- electrical feedback means for providing the $-\Delta f_1(Z)X$ term, connected from the potetniometer output to said summing means;
- a serially connected amplifier and servo motor connected to receive signals from the output of said summing means, and to drive said output shaft.

10. A computer for determining the true angle of attack of an aircraft comprising:
- electrical means for generating an electrical signal proportional to the sensed angle of attack provided by a mechanical sensing vane mounted on the outside of the aircraft;
- a shaft, adapted to be rotated in proportion to the Mach number of said aircraft;
- first and second means attached to said shaft for generating first and second separate predetermined functions of Mach number in the form of electrical signals;
- a servo amplifier;
- a servo motor serially connected to be driven by said amplifier;
- an output shaft coupled to said servo motor for delivering a rotation proportional to the true angle of attack of the aircraft;
- electrical means secured to said output shaft and electrically connected to said first Mach number function generator for generating an electrical feedback signal proportional to the product of the true angle of attack and said first function of Mach number;
- transducer means for combining separate electrical and mechanical signals to produce a combined electrical signal proportional to the sensed angle of attack less the product of a constant times the true angle of attack;
- mechanical feedback means for connecting the output shaft to said transducer means;
- electrical means for connecting the electrical signal proportional to the sensed angle of attack to said transducer means; and
- additive means, connected to the output of said transducer means, to said electrical means secured to said output shaft, and to said second means for generating said second predetermined function of Mach number, for applying the combined electrical signal, the output of said second Mach number function generator and said electrical feedback signal to the input of said servo amplifier.

11. In a servoed analog computer adapted to generate an output shaft position which is a measure of the true angle of attack of a supporting aircraft in response to a received electrical polyphase signal which is a measure of the sensed angle of attack of a supporting aircraft and having a motor driving its output shaft and a servo amplifier for driving said motor, said amplifier having a summing junction on its input terminals adapted to receive three input signals, and having a control transformer adapted to receive the electrical polyphase input signal on its stator and having its rotor connected to one of said input terminals of said amplifier, the improvement comprising:
- means for mechanically coupling the output shaft of said motor to the rotor of said synchro control transformer;
- means, connected to a second of the input terminals to said amplifier, for generating an electrical signal which is a predetermined function of Mach number; and
- means, electrically connected to the third of said input terminals of said amplifier, for generating an electrical signal which is proportional to the product of the position of the shaft of said motor multiplied by a second predetermined function of Mach number.

12. A computer comprising:
- a control transformer including a movable rotor and rotor winding and a polyphase stator adapted to receive a polyphase signal which is a measure of an angle;

a servo amplifier;

a servo motor connected to be driven by said servo amplifier;

a mechanical feedback means for mechanically coupling the output shaft of said servo motor to the rotor of said transformer;

a summing circuit connected to the input of said servo amplifier;

second feedback means including a potentiometer connected to be driven by said servo motor and electrically connected to said summing network;

means for varying the relative amount of feedback provided by one of said feedback means compared to that provided by the other; and means for electrically connecting the rotor of said control transformer to said summing network.

13. Means for correcting a signal, $y$, to produce a modified value of the signal, $x$, in which $$y = Kx + \Delta f_1(z)x - f_2(z)$$

wherein $z$ is an independent variable, $K$ is a constant, $\Delta f_1(z)$ and $f_2(z)$ are predetermined functions of $z$, and $y$ is a polyphase signal comprising:

a control transformer whose stator winding is adapted to be connected to said polyphase signal;

first potentiometer means, adapted to be connected to a source of voltage, having its slider adapted to be positioned proportional to the factor $z$, and contoured to generate a voltage on its slider proportional to the function $\Delta f_1(z)$;

second potentiometer means, adapted to be connected to a source of voltage, having its slider adapted to be positioned proportional to the factor $z$, and contoured to generate a voltage on its slider proportional to the function $f_2(z)$;

third potentiometer means, connected to the slider of said second potentiometer means;

summing amplifier means having three input terminals, one connected to the rotor of said control transformer, a second connected to the slider of said first potentiometer means, and the third connected to the slider of said third potentiometer means;

a motor, connected to be driven by said amplifier and mechanically driving both the slider of said third potentiometer means and the rotor of said control transformer.

14. A device as recited in claim 13 in which the slider of said first and second potentiometer means are driven proportionally to the Mach number of an aircraft, and in which said polyphase signal is a measure of the angle of attack sensed by a sensing vane mounted on the outside of an aircraft.

References Cited by the Examiner

UNITED STATES PATENTS

| 2,670,456 | 2/1954 | Naylor et al. | 318—30 |
| 2,775,124 | 12/1956 | Gardner et al. | |
| 2,832,021 | 4/1958 | Cantwell | 318—30 |
| 2,913,180 | 11/1959 | Rusk | 235—183 |
| 2,915,247 | 12/1959 | Tolson | 235—183 |
| 2,934,267 | 4/1960 | Wirkler et al. | 235—151 |
| 2,985,373 | 5/1961 | Helgeson et al. | 235—151 |

OTHER REFERENCES

Page 366, 1948, Greenwood, Holdam and Macrae, Electronic Instruments. New York, McGraw-Hill (MIT Radiation Laboratory Series, volume 21).

MALCOLM A. MORRISON, *Primary Examiner.*

WALTER W. BURNS, JR., *Examiner.*

C. L. WHITHAM, I. KESCHNER,
*Assistant Examiners.*